United States Patent [19]

Batcheller et al.

[11] Patent Number: 5,032,705

[45] Date of Patent: Jul. 16, 1991

[54] ELECTRICALLY HEATED GARMENT

[75] Inventors: Barry D. Batcheller, West Fargo; Kevin L. Brekkestran; Roger L. Minch, both of Fargo, all of N. Dak.

[73] Assignee: Environwear, Inc., Fargo, N. Dak.

[21] Appl. No.: 405,627

[22] Filed: Sep. 8, 1989

[51] Int. Cl.⁵ ............................................. H05B 3/36
[52] U.S. Cl. ..................................... 219/211; 219/529
[58] Field of Search ............... 219/211, 212, 528, 529, 219/549

[56] References Cited

U.S. PATENT DOCUMENTS

| | | |
|---|---|---|
| 710,429 | 10/1902 | Collins et al. |
| 1,284,378 | 11/1918 | Lemercier .......................... 219/211 |
| 1,328,229 | 1/1920 | Hewitt ................................. 219/211 |
| 1,358,509 | 11/1920 | Birkenfeld .......................... 219/211 |
| 1,655,838 | 1/1928 | Lackland . |
| 1,691,472 | 11/1928 | Graham ............................... 219/211 |
| 1,761,829 | 6/1930 | Heinemann . |
| 1,820,602 | 8/1931 | Dick . |
| 2,329,766 | 9/1945 | Jacobsen ............................. 219/211 |
| 2,458,119 | 1/1949 | Van Daam ........................... 219/211 |
| 2,460,433 | 1/1949 | Ripley . |
| 2,579,383 | 12/1951 | Goudsmit . |
| 2,696,549 | 12/1954 | Sturtevant .......................... 219/212 |
| 2,850,712 | 9/1958 | Franklin .............................. 339/103 |
| 2,858,410 | 10/1958 | Rich ..................................... 219/ |
| 3,084,241 | 4/1963 | Carrona .............................. 219/ |
| 3,134,891 | 5/1964 | Hyer ................................... 219/211 |
| 3,293,405 | 12/1966 | Costanzo ............................ 219/211 |
| 3,363,087 | 1/1968 | Buxbaum et al. ................... 219/201 |
| 3,663,797 | 5/1972 | Marsh ................................. 219/211 |
| 3,729,613 | 4/1973 | Deloire et al. ..................... 219/211 |
| 3,751,620 | 8/1973 | Yuasa ................................. 219/211 |
| 3,781,514 | 12/1973 | Olson et al. ........................ 219/211 |
| 3,783,240 | 1/1974 | Drummond ........................ 219/211 |
| 3,789,190 | 1/1974 | Orosy et al. ....................... 219/497 |
| 3,858,028 | 12/1974 | Kerr ................................... 219/211 |
| 3,946,193 | 3/1976 | Giese .................................. 219/211 |
| 3,999,037 | 12/1976 | Metcalf .............................. 219/211 |
| 4,087,675 | 5/1978 | Sansonetti ......................... 219/211 |
| 4,132,262 | 1/1979 | Wibell ................................ 219/212 |
| 4,251,718 | 2/1981 | Cole ................................... 219/501 |
| 4,274,145 | 6/1981 | Hendricks et al. ................. 364/557 |
| 4,277,670 | 7/1981 | Mori et al. ......................... 219/492 |
| 4,359,626 | 11/1982 | Potter ................................ 219/490 |
| 4,404,460 | 9/1983 | Kerr ................................... 219/211 |
| 4,406,512 | 9/1983 | Schell ............................... 339/177 R |
| 4,485,296 | 11/1984 | Ueda et al. ........................ 219/497 |
| 4,523,084 | 6/1985 | Tamura et al. .................... 219/497 |
| 4,549,074 | 10/1985 | Matsuo .............................. 219/505 |
| 4,665,308 | 5/1987 | Courvoisier et al. ............. 219/548 |
| 4,713,531 | 12/1987 | Fennekels et al. ................ 219/545 |
| 4,768,979 | 9/1988 | Wa .................................... 439/622 |
| 4,798,936 | 1/1989 | Johnson, Sr. ...................... 219/217 |

FOREIGN PATENT DOCUMENTS

| | | | |
|---|---|---|---|
| 1100384 | 9/1955 | France ............................... 219/528 |
| 57-13526 | 1/1982 | Japan ................................. 219/212 |
| 88/10057 | 12/1988 | PCT Int'l Appl. ................. 219/212 |
| 99475 | 7/1923 | Switzerland ...................... 219/528 |

OTHER PUBLICATIONS

Monogram Electric, Ltd., "Automatic Blanket", published 1962.

Primary Examiner—Teresa A. Walberg
Attorney, Agent, or Firm—Harness, Dickey & Pierce

[57] ABSTRACT

An electrically heated, cold weather garment. The garment includes a lightweight, stretchable, form-fitting fabric for covering portions of the body of a wearer of the garment; a plurality of flexible, electrical heating wires cover stitched to the fabric by sewing; an electronic controller for controlling current flowing through each of the heating wires in a pulse-width modulated fashion, to thereby independently control the heat generated by each heating wire; a plurality of potentiometers for controlling the level of power supplied to each heating wire; and a master power level potentiometer for controlling the power supplied to each of the heating wires in a uniform and simultaneous fashion. In a first preferred embodiment the controller utilizes a combination of analog and digital-like signals to control in a pulse-width modulated fashion the current flow through the heating elements. In a second preferred embodiment the controller includes a microprocessor which is operable to sense changes in the temperature of the heating wires themselves, and to regulate automatically and independently the power supplied to each of the heating wires.

21 Claims, 6 Drawing Sheets

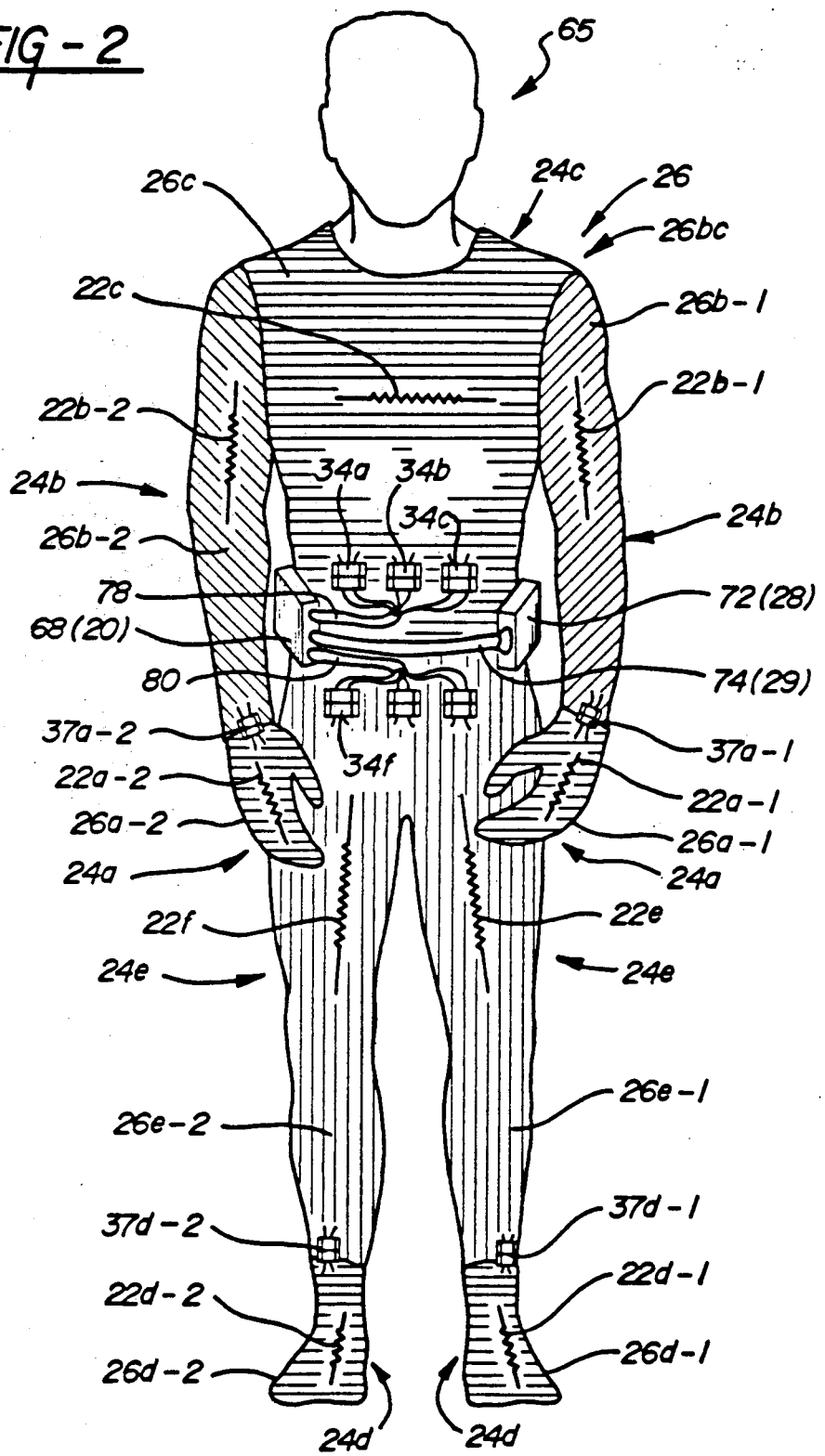

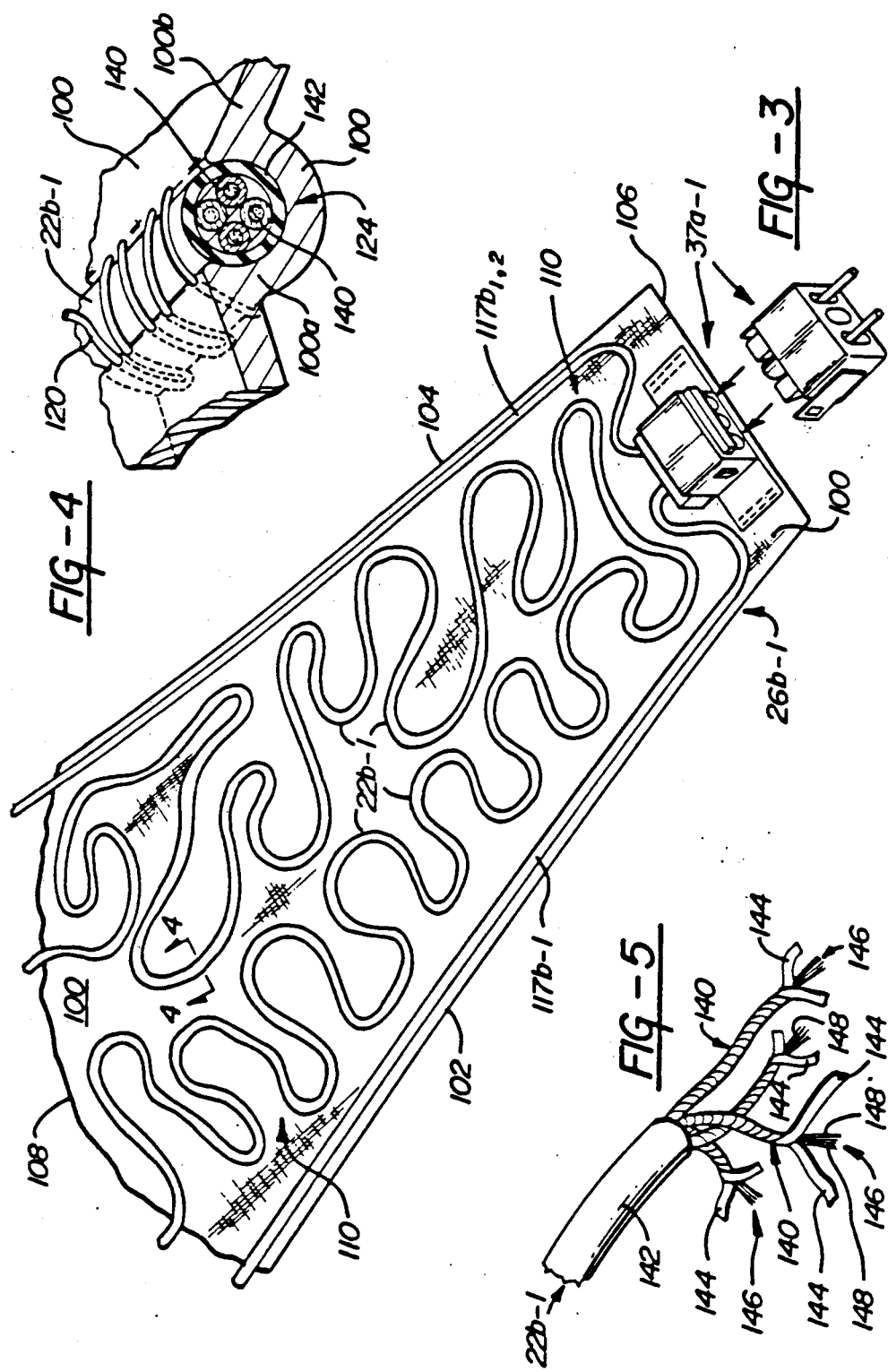

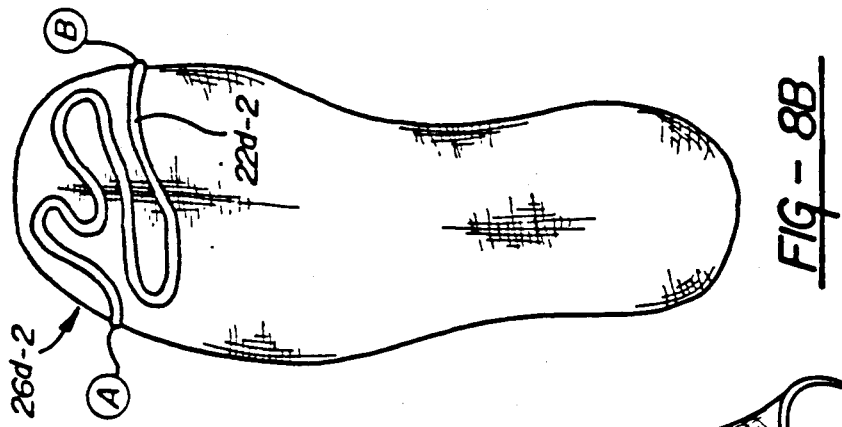
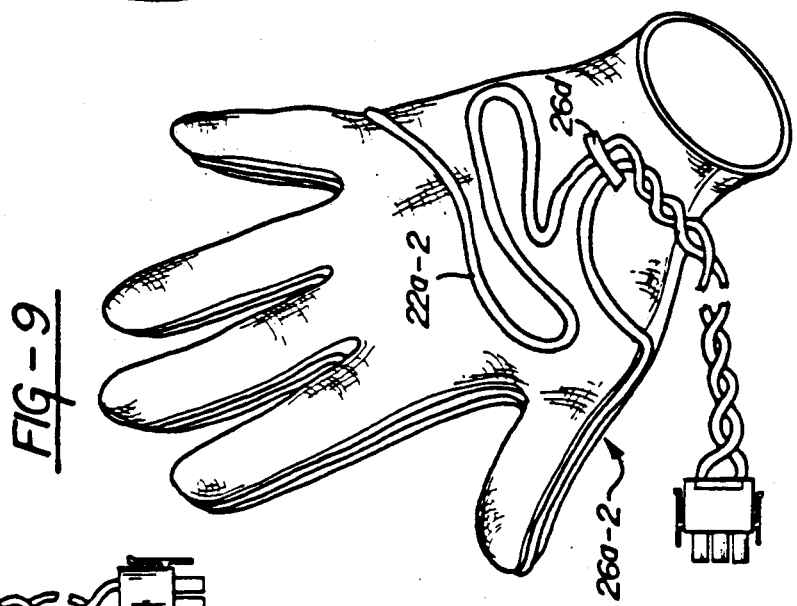
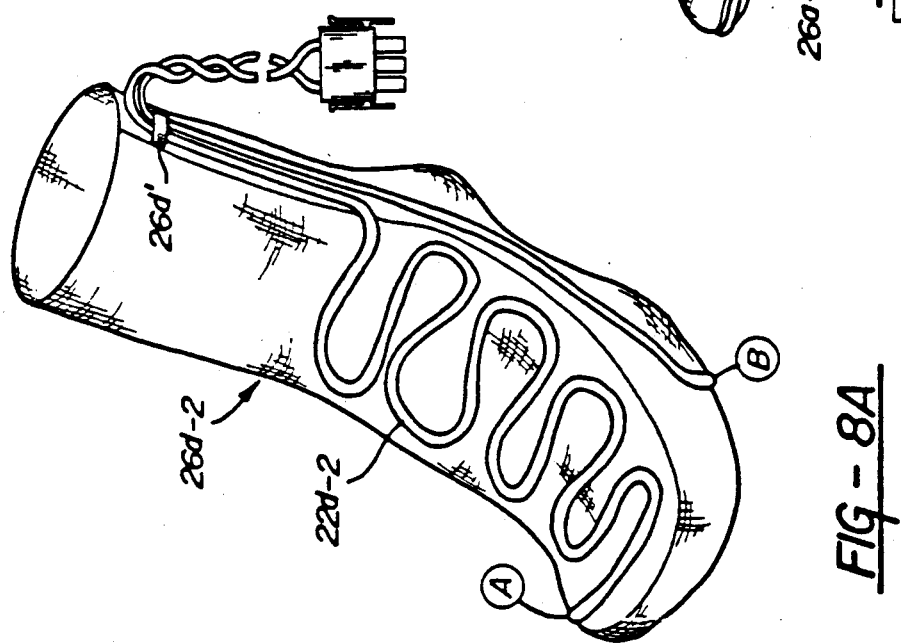

ELECTRICALLY HEATED GARMENT

CROSS-REFERENCE TO RELATED APPLICATIONS

The present application is related to the following commonly assigned, patent applications filed concurrently herewith:

"Electronic Control System and Method For Cold Weather Garment", application Ser. No. 07/405,626;

"Hybrid Electronic Control System and Method For Cold Weather Garment". application Ser. No. 07/405,142;

"Fused Electrical Connector With Sewing Wings", application Ser. No. 07/404,887, now U.S. Pat. No. 4,927,366; and "Electrically Heated Form-Fitting Fabric Assembly", application Ser. No. 07/404,827.

The disclosures of all of the applications cited above are hereby incorporated by reference and made a part hereof the same as if fully set forth herein.

BACKGROUND OF THE INVENTION

1. Technical Field

This invention relates to cold weather garments, and more particularly to an electrically heated cold weather garment and electronic control system and method therefor for controlling electric heating levels within the garment.

2. Discussion

Electrically heated garments, or portions thereof, are helpful in combating the effects of cold temperatures on a person subjected to prolonged exposure to the cold. More specifically, a heated garment can prove helpful to persons such as sportsmen, farmers, construction workers, public officials, military personnel, etc., who frequently are exposed to cold weather for prolonged periods of time.

Problems with prior art electronic control systems for electrically heated garments have existed with respect to the ability to heat a plurality of discrete heating zones of the garment independently. Heating different zones individually with a high degree of control is desirable because of the varying rate at which different parts of the body lose heat. The extremities, i.e., hands, feet and head, for example, suffer from a greater heat loss than the torso. In addition, physical activities of the wearer of the garment can cause different parts of his body to generate heat at varying levels. A system which applies the same level of heat to all areas of the garment can therefore produce temperature levels within the garment that are uncomfortable to the wearer.

Prior art electronic control systems, to be able to control the heat applied to various zones of the garment independently, typically require an independent, user actuatable switch for each zone to enable or interrupt the current flowing to its associated heating element or elements. In these systems the control of the wearer over the amount of heat generated by the various heating elements of the suit is quite limited., the heating elements are either fully on or fully off, thereby generating either maximum heat or no heat at all. In some prior art systems, attempts have been made to provide variable control over the heat generated by each heating element by using switches to selectively connect a power source to a plurality of heating elements having different heat generating capabilities or characteristics. In this manner some control is allowed over the amount of heat generated for a particular zone of the garment, but still only in fixed steps.

Another drawback of many prior art heated garments is the fabric used for the garment itself. Ideally, the fabric should be light in weight and not bulky to minimize the loss of flexibility during physical activities of the wearer. The fabric itself should also have excellent insulating capabilities, be stretchable, and be capable of rapidly absorbing and evaporating moisture and perspiration from the skin of the wearer. Many prior art heated garments suffer from a lack of one or more of these features. Various prior art heated garments and component parts thereof may be found in the following U.S. Patents:

| U.S. Pat. No. | Issued | Inventor(s) |
| --- | --- | --- |
| 710,429 | 1902 | Collins et al |
| 1,284,378 | 1918 | A. Lemercier |
| 1,328,229 | 1920 | F. Hewitt |
| 1,655,838 | 1928 | E. Lackland |
| 1,761,829 | 1930 | O. Heinemann |
| 1,820,602 | 1931 | T. Dick |
| 2,329,766 | 1943 | W. Jacobsen |
| 2,460,433 | 1949 | E. Ripley |
| 2,579,383 | 1951 | F. Goudsmit |
| 2,858,410 | 1958 | C. Rich |
| 3,084,241 | 1963 | Carrona |
| 3,134,891 | 1964 | M. Hyer |
| 3,293,405 | 1966 | R. Costanzo |
| 3,663,797 | 1972 | R. Marsh |
| 3,729,613 | 1973 | R. Deloire et al |
| 3,751,620 | 1973 | T. Yuasa |
| 3,781,514 | 1973 | M. Olson et al |
| 3,858,028 | 1974 | J. Kerr |
| 3,946,193 | 1976 | E. Giese |
| 4,087,675 | 1978 | C. Sansonetti |
| 4,404,460 | 1983 | J. Kerr |
| 4,665,308 | 1987 | G. Courvoisier et al |
| 4,713,531 | 1987 | Fennekels et al |

While each of the above systems, or portions thereof, operate with varying degrees of effectiveness, it would nevertheless be desirable to have an electrically heated cold-weather garment having a plurality of discrete heating zones. It would further be desirable if such a garment were to incorporate a lightweight, stretchable, form-fitting fabric which would allow the wearer of the garment excellent flexibility and range of movement when performing a variety of physical activities.

It would further be desirable if such a garment were to include a plurality of flexible electrical conductors arranged in a predetermined fashion to generate heat evenly throughout a particular area, or zone, of the garment. The utility of the suit would also be increased if the conductors were independent, such that a break in one conductor would not affect the heat generating capabilities of conductors for other areas or zones of the garment. An additional desirable feature of such a garment would be the incorporation of a plurality of independent connectors for independently connecting the heat generating conductors with a power source. Such a plurality of connectors would further help to enable many of the conductors to remain operating if one of the conductors were to break and cease operating.

It is therefore an object of the present invention to provide a lightweight, stretchable, form-fitting fabric for use in connection with an electrically heated, cold-weather garment, which is flexible and allows excellent range of movement to a wearer of the garment.

It is an additional object of the present invention to provide a garment assembly having a plurality of independent conductors, with each conductor being arranged in a predetermined fashion within a particular heating zone of the garment, to thereby heat evenly the particular zone.

It is still a further object of the present invention to provide an electrically heated garment having a plurality of connectors for connecting the conductors of the garment to an external power source. Such a plurality of connectors would thereby enable heat to be supplied to one area or zone of the garment even if a different conductor were broken, and thus would further add to the utility and durability of the suit.

It is another object of the present invention to provide for an electrically heated garment having the conductors thereof securely attached to the fabric of the garment in such a fashion as to hold securely thereto the conductors.

It is still another object of the present invention to provide for an electrically heated garment having an electronic control system operable to independently and simultaneously, and in uniform fashion, control the current flow through each conductor of the garment.

SUMMARY OF THE INVENTION

The above objects are provided by an electrically heated, cold weather garment in accordance with the present invention. The garment comprises: relatively lightweight, stretchable, form-fitting fabric means for covering at least a portion of the body of the wearer of the garment; flexible conductor means secured to the fabric means for generating heat in response to a current flow therethrough to thereby provide warmth to a wearer of a garment; controller means for controlling in a pulse-width modulated fashion the current flow through the conductor means, thereby controlling the heat generated by the conductor means; and power level selection means for allowing manual control over the controller means by a wearer of the garment, thereby providing wearer control over the current flow through the conductor means, and thereby providing wearer control over the heat generated by the conductor means.

BRIEF DESCRIPTION OF THE DRAWINGS

The various features and advantages the electronic control system and method of the present invention will become apparent to those skilled in the art upon reading the following specification and subjoined claims, and by reference to the drawings wherein like reference numerals designate similar components in the various Figures, and in which:

FIG. 2 is an illustration of one possible arrangement of the FIG. 1 control system and full body electrically heated garment including several independent heating zones, with a highly simplified representation of the resistive heating elements within each zone;

FIG. 3 is a perspective view of the arm panel of fabric for the garment, prior to its longitudinal edges being sewn together, which shows the serpentine pattern in which the wire heating element is preferably arranged;

FIG. 4 is a highly enlarged perspective, cross-sectional view of a fragment of the FIG. 3 arm panel taken along line 4—4 of FIG. 3 and illustrating the cover stitching holding a wire heating element to the fabric in a manner which pulls the fabric upwardly to partially circumscribe the wire heating element;

FIG. 5 is a perspective view showing the construction of a multiple conductor tinsel wire with an outer insulating jacket that is a preferred wire heating element for the FIG. 2 garment;

FIGS. 8a and 8b are perspective views of the front and bottom toe portions of the left sock section of the FIG. 2 garment, and show the preferred wire heating element pattern therefor;

FIG. 9 is a perspective view of the right glove section of the FIG. 2 garment showing a preferred arrangement for the wire heating element and connector.

DETAILED DESCRIPTION OF THE PREFERRED EMBODIMENTS

Figure 1:
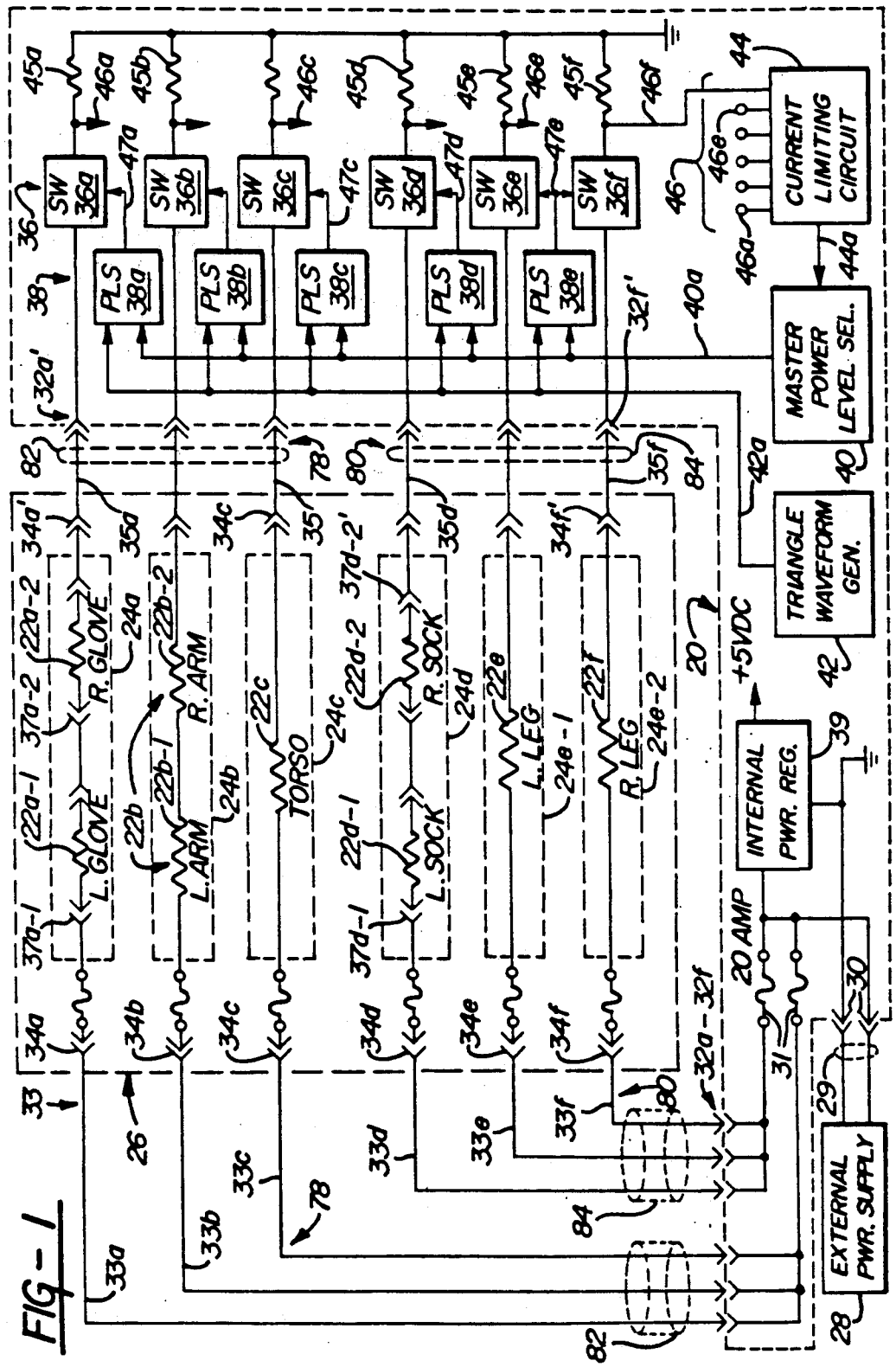
FIG. 1 is a simplified block diagram of the overall hybrid electronic control system of the present invention for controlling an electrically heated cold weather garment, which is shown in the diagram as a group of resistive heating elements, with the control system including pluralities of solid-state switching elements and power level selection devices, a triangular waveform generator, a master power level selection device, and an overcurrent protection circuit.

FIG. 1 shows a simplified block diagram of the overall electronic control system 20 of the present invention. The system 20 is a proportional, open-loop control system which supplies PWM current signals to resistive heating elements $22a$–$22f$ respectively located within independent heating zones $24a$–$24e$ of an electrically heated garment 26. The garment 26 and its independent zones are indicated by dashed line blocks in FIG. 1. The independent heating zones $24a$–$24e$ of the garment 26 will be discussed in more detail in connection with FIG. 2. The system 20 may if desired be constructed on single printed circuit ("PC") board housed with a small wearable injection-molded plastic housing, as shown in FIG. 2.

The system 20 may be powered by any suitable electrical power source such as internal or external batteries, or a power cord connected to any convenient source of power such as a portable generator or the electrical system of a boat, snowmobile, cycle or jeep. Due to weight considerations, an external source of power is preferred over batteries when available, and is represented by external power supply 28 in FIG. 1. The power source preferably provides to the control system 20 a substantially constant voltage, direct current ("DC") signal in the range of about 10 to 24 volts, and more preferably 12 to 14 volts. However, if desired, an alternating current ("AC") source may be used by providing a conventional AC-to-DC converter as part of the system 20.

DC electrical power is supplied through conductors 29 to electrical connectors 30 and then through two suitably sized fuses 31, which in turn supply power through electrical connectors 32 and conductors 33 to fused electrical connectors 34 leading to the heating elements 22a–22f. The electrical power, after passing through the resistive elements 22, travels through the return paths within connectors 34 to wires 35 that lead back to electrical connectors 32 leading to the control system 20. Additional electrical connectors 37a and 37d are also preferably provided for the heating elements 22a and 22d so that the hands and socks sections of the garment 26 can be separately disconnected. The connectors 30, 32 and 32' are preferably conventional edge connectors which fasten to the PC board of the system 20.

The control system 20 includes: a group 36 of solid-state power switching ("SW") devices 36a–36f, a group 38 of user-adjustable power level selection ("PLS") circuits 38a–38e, an internal power regulator circuit 39, an optionable user-adjustable master power level selection circuit 40, a periodic waveform generator 42, and current-limiting protection circuitry 44. The functions of each of these components or circuits will now be briefly explained.

The power regulator circuit 39 is of conventional design and converts a small portion of the unregulated electrical power from connectors 30 into +5 volts DC for use as needed by the other circuits within system 20.

The group 36 of switching ("SW") means 36a–36f are for rapidly and independently turning on and off the heating element or elements of each of the heating zones 24a–24e. Each of the switching means 36 preferably includes a metal-oxide semiconductor field effect ("MOSFET") power transistor. These switching transistors 36a–36f are controlled by the group 38 of first power level selection means 38a–38e, which are individual circuits that provide pulse width modulated (i.e., rapid on and off) control signals on lines 47a–47e to cause the desired finely controlled switching action of the switching transistors 36a–36f to produce the desired average level of heating within each zone. It should be noted that because of the larger amount of current which may be required to heat the leg portions 24e, the control system 20 preferably incorporates separate switching transistors 36e and 36f, as shown in FIG. 1, for the left and right leg heating elements 22e and 22f respectively. It should be appreciated, however, that the control system 20 could easily be modified by those skilled in the art to operate with only a single switching transistor 36, and that two switching transistors 36e and 36f have been incorporated merely to even further enhance the operability of the system.

Further control of the switching transistors 36 is provided through a second or master, power level selection circuit 40. The master power level selection circuit 40 provides a control signal on line 40a for the simultaneous and uniform control or adjustment of the duty cycle of the PWM signals controlling the on and off switching action of all the switching transistors 36 are described further in conjunction with FIG. 6 in aforementioned copending application Ser. No. 07/405,142. It should be appreciated, however, that the master power level selection circuit 40 is not necessary for proper operation of the system 20, but has been included to provide a global or over-all adjustment for the individual switching transistors 36a–36d, to thereby provide a wearer of the garment 26 with a way of easily and simultaneously varying the heating levels of all the individual heating elements 22a–22f, either up or down, as desired.

In the system 20, the waveform generator 42 provides on line 42a a repetitive sweep signal, such as a triangular waveform, that is used as the time base in producing the PWM control signals that regulate the switching action of the power transistors 36. The functions and interactions of the individual zone power level selection circuits 38, the master power level selection circuit 40, and how the pulse width modulation is produced by using the triangle waveform from generator 42 are be discussed in greater detail in connection with FIG. 6 of the aforementioned co-pending U.S. application Ser. No. 07/405,142.

The current limiting circuit 44 of system 20 is an overload prevention circuit that monitors the total current flowing through the heating elements 22a–22f. This monitoring is accomplished by shunt resistors 45a–45f which provide individual voltage signals on conductors 46a–46f to current-limiting circuit 44. When the total current exceeds a predetermined threshold or amount, circuit 44 supplies an overriding control signal via line 44a to the master power level selection circuit 40 that automatically reduces the duty cycle of the PWM signals driving the switching transistors 36, which limits the current flowing through each of the heating elements 22 in a simultaneous and uniform manner. The current limiting protection circuitry 44 will also be discussed in connection with FIG. 6.

Due to the large current requirement for heating the pants zone 34e, two separate power switches 36e and 36f, connectors 32e and 32f wiring sets 35e and 35f and heating elements 22e and 22f are used. Note that the output signal from PLS circuit 44e is fed as the PWM input signal on line 47e to both power switches 36e and 36f. In this manner, one PLS circuit 38 identically controls two separate power switches and heating elements.

FIG. 2 is a pictorial illustration of the overall garment 26 being worn by a man 65. The garment 26 is preferably worn as an under-garment very close to the skin to maximize heat transfer to the body and to allow insulating layers of clothing to be placed over it to help retain heat which the heating elements 22 generate. The garment 26 is preferably tight-fitting, and highly stretchable to minimize air pockets and other spaces between the garment and the skin that tend to trap air, reduce heat transfer.

FIG. 2 shows the different independent heating zones 24a–24e of the garment 26. The heating elements 22a-1–22d-2 are also shown in FIG. 2 as simple resistors to avoid cluttering the Figure. The preferred constitution and pattern of the heating elements will be discussed shortly in connection with FIGS. 3 through 5. The man 65 is shown wearing, at the right side of his waist, a slim lightweight rectangular enclosure 68 which houses the electronics of the control system 20, and, at the another slim lightweight enclosure 72 which may house any conventional high-energy battery pack. A battery pack may, if desired, serve as the external power supply 28 shown in FIG. 1. A suitable length power cord 74 may be used to connect the pack 72 to system 20 or to another nearby electrical power source.

Electrical wiring harnesses 78 and 80 are used to connect the control system 20 to connectors 34a through 34c and connectors 34d through 34f as shown. Harnesses 78 and 80 include conventional insulative protective sheathings 82 and 84, which are represented by dashed lines in FIG. 1. As shown in FIG. 1, wiring harness 78 includes conductors 33a-33c and 35a-35c, while wiring harness 80 includes conductors 33d-33f and 35d-35f.

The overall garment 26 shown in FIG. 2 preferably consists of four separately wearable garment sections, namely: the hand section 26a consisting of hand coverings 26a-1 and 26a-2 to heat the left hand and right hand respectively; the long-sleeve shirt section 26bc covering the arms and torso including the shoulders; the socks section 26d consisting of socks 26d-1 and 26d-2 covering the left foot and right foot respectively; and the pants section 26e-1 and 26e-2 covering both legs and the hip area. The hand coverings 26 may be mittens, but preferably are gloves for greater finger dexterity.

In the garment 26 as shown in FIG. 2, heating zone 24a is made up of the two hand coverings 26a. Zone 24b includes the left and right arm sections 26b-1 and 26b-2 of the garment 26, while a third zone 24c covers the torso including the shoulders. The socks zone 24d covers both feet including the ankles. The legs zone 24e-1 and 24e-2 covers both legs and the hip area. Although five independent zones have been illustrated in FIG. 2, it should be appreciated that any convenient number of discrete independent heating zones may be employed, as long as an appropriate number of power switching devices and independent power level selection circuits are also included in the system 20. For example, an additional zone could be provided so as to heat each hand separately, and/or another zone could be provided to heat the head, assuming of course that another garment section, taking the form of a hood, face mask or the like, is provided.

The garment 26 may be one-piece if desired, but is preferably constructed as at least a two piece suit comprising a vest or shirt section and a pants section. The term "vest" is used here in its usual sense as an article of clothing that covers most of the torso, but not the arms. The shirt section may be either long-sleeve or short-sleeve or may have an in-between sleeve length. The pants section may similarly have any desired length of pant leg. Such two (or more) piece constructions allow the garment 26 to be easily and quickly put on and removed, and also allow each section to be used or replaced separately. The hand zone 24a and socks zone 24d are optional, and their respective garment sections 26a and 26d need not be worn unless desired. To facilitate such optional use, the additional electrical connectors 37a-1, 37a-2, 37d-1 and 37d-2 are respectively provided so that the hand coverings 26a-1, 26a-2 and socks 26d-1 and 26d-2 may be individually removed whenever desired.

The two piece suit configuration is facilitated by the two sets of connectors 34a through 34c and 34d through 34f which are preferably located generally where shown in FIG. 2. The connectors 34a through 34f each also preferably contain a built-in fuse which may be sized as desired (for example, at 7 to 8 amps) to provide individual short circuit protection for respective electrical heating elements 22a through 22f in the garment 26. Suitable fused and unfused electrical connector assemblies of the type just mentioned may be attached by sewing one-half of each such connector assembly to respective sections of the garment as shown in FIG. 2. Such connector assemblies are fully described in aforementioned application Ser. No. 07/404,887. Note that the fuses 31 within control system 20 also provide protection against short circuits.

The use of these types of connectors 34 and 37, as shown in FIG. 2 and mentioned earlier herein, with each zone 24a-24e of the garment 26 allows the garment 26 to be readily be configured as desired by the wearer to adapt to specific weather conditions and activity requirements of the wearer. It should also be appreciated that connectors may be used elsewhere, for example, at the shoulder, to make the arm section 26b and arm zone 24b individually detachable from the torso section 26c.

The fabric of the garment 26 may be of any suitable material, but preferably is a polyester blend which is lightweight and not bulky, thereby allowing the garment 26 to be worn comfortably during a wide variety of cold weather outdoor activities. Such a lightweight material should have a weight in the range of about 2 to 20 ounces per square yard, with the preferable range of weight being from about 6 to 8 ounces per square yard.

The fabric of the garment 26 preferably also incorporates material which is stretchable to facilitate flexibility of the various portions of the garment 26 during physical activities of the wearer, and to further enhance the comfort of the garment 26. The break elongation (i.e., a percentage of elongation of the material from a non-elongated or resting state before breakage or tearing occurs) of the fabric should be in the range of preferably about 100% to 1000%. The tensile recovery (i.e., that percentage of recovery of the material from an elongated condition to a non-elongated or resting condition) of such a material should also be in the range of preferably about 50% to 100% from about a 50% elongation. A material incorporating "spandex" fibers would be particularly desirable in this regard. Spandex fibers include a fiber-forming substance in the form of long-chain synthetic polymers comprised of at least about 85% of a segmented polyurethane, and are helpful in imparting elasticity to garments such as girdles, socks, and special hosiery.

Another important characteristic of a suitable fabric is its tensile strength. The fabric should have a tensile strength of at least about 0.2 gpd (grams per denier), and preferably about 0.8 gpd or higher.

The fabric of the garment 26 will preferably also incorporate a material having good insulating capabilities. A suitable material for this purpose preferably incorporates fibers made at least partially from polyethylene terephthalate. Material incorporating polyethylene terephthalate fibers will not only provide excellent insulating qualities but will further provide high elastic recovery and good resistance against insect bites.

Still another important consideration in maximizing the comfort provided by the garment 26 is the "wicking" action provided by the fabric. By "wicking", it is meant the ability of the fabric of the garment 26 to absorb moisture and perspiration from the skin of a wearer and dissipate the moisture and/or perspiration through evaporation. The insulating material described above, i.e., material incorporating polyethylene terephthalate fibers, is also particularly effective for this purpose.

The fabric of the garment 26 further preferably has a tight or form-fitting characteristic as mentioned briefly hereinbefore. A form-fitting fabric eliminates an undesirable effect known generally as "pumping". Pumping occurs when a loose-fitting, heated fabric is used in a garment or similar article and results in warm air being "pumped" from within the loose-fitting areas of the fabric, eventually into the ambient environment. This pumping action contributes to inefficiency in the heating operation of a heated garment and results in wasted power of the garment's power source. By employing a tight or form-fitting fabric, however, this undesirable effect is greatly or completely eliminated because air pockets formed between loose-fitting areas of the fabric and a wearer's skin are substantially eliminated. Insulating material incorporating polyethylene terephthalate and spandex fibers are also very effective in this regard, and should preferably be incorporated for this reason.

A very desirable fabric for providing the above qualities is available commercially from E.I. du Pont de Nemours and Co., of Wilmington, Delaware ("DuPont"). The fabric generally consists of a blend of about 92% THERMAX and about 8% LYCRA. THERMAX is a trademark of DuPont and consists of 100% DACRON (DACRON also being a DuPont trademark) polyester knit fabric, which is a highly insulating synthetic fabric including polyethylene terephthalate fibers. LYCRA is also a trademark of DuPont for its brand of spandex. This blend of materials is particularly effective in providing a fabric which not only has excellent insulating characteristics and stretchability, but which is also form-fitting, soft, which resists shrinkage, thereby retaining its shape and fit, and which is also machine washable and dryable, as well as mildew and odor-retaining resistant.

The resistive heating elements 22a-1–22f are each made of a continuous piece of suitably sized multi-strand copper wire to facilitate flexion in all directions without breakage. Suitable gauges for the wire are 20 to 33 gauge (AWG), with 26 gauge being preferred for the shirt and pants sections, and 28 gauge for the hands and socks sections. The insulated heating elements are capable of heating to at least a level which provides a feeling of warmth against the wearer's skin which corresponds to about 100° Fahrenheit, without producing an uncomfortably warm sensation against the skin of the wearer. The copper wire will also preferably have a consistent percent quantity of copper from suit to suit to provide an accurate and repeatable temperature to resistance relationship. Further details on the construction of the heating elements 22 will be provided in connection with the discussion of FIGS. 4 and 5.

FIG. 3 shows a panel 100 of fabric used to make a sleeve or arm, such as the left arm section 26b-1 of the garment section 26 of FIG. 2. The panel 100 has two longitudinal edges 102 and 104 which are sewn together to form a conventional sleeve seam, wrist edge 106 and curved edge 108 which forms part of the shoulder seam. FIG. 3 illustrates a typical serpentine pattern 110 in which the wire heating element 22b-1 is preferably arranged on the left arm section 26b-1. Similar serpentine patterns are preferably used for the other heating wires 22c, 22e and 22f in the arms, torso and leg sections of garment 26. It should be understood, however, that variations in the serpentine pattern 110 may be made to adapt it to other parts of the garment 26 such as the torso. The bends and curves in the serpentine pattern 110 shown in FIG. 3 have radiuses which are of at least about ⅛ inches, and preferably at least ¾ inches. Furthermore, closely adjacent portions of the heating elements 22 are spaced apart by at least about ⅛ inches, and preferably by at least about ½ inches to help prevent localized "hot spots" from being formed on the fabric.

The critical concern of any serpentine or other pattern used is that there are no sharp bends in the wire heating elements 22, which would likely significantly increase the chance of breakage as the body panel or section of the garment 26 into which the heating wires 22 are sewn move and stretch during repeated wearings. The serpentine pattern 110 addresses this concern well, however, as it allows the heating elements 22 to bend and flex easily and even move relative to the fabric well and stitching surrounding it without breaking while the garment 26 is being stretched in various directions while being worn.

The serpentine pattern 110 of FIG. 3 provides a more uniform distribution of the heat produced by each heating element 22 of the garment 26 which is so arranged. As such, when the left arm section 26b-1 is sewn into its final constructed form, the various areas of the left arm section, (i.e., upper arm, lower arm, front and back of the arm) will all be heated relatively uniformly by the heating element 22b-1.

FIG. 3 also shows electrical connector assembly 37a-1 for providing power to the wire heating element 22a-1 in the left hand covering or glove 26a-1 (not shown in FIG. 3). Power is provided to connector 37a-1 via electrical conductors 117b-1 and 117b-1,2 which are routed along the longitudinal edges 102 and 104 respectively of fabric panel 100. Further details of the routing of the conductors 117b-1 and 117b-1,2 will be provided in the discussion of FIG. 6.

In FIG. 4, an enlarged, fragmentary, perspective, view of heating element 22b-1 showing the manner in which it is stitched in place in the fabric panel 100 of FIG. 3. From FIG. 4, it can be seen that the cover stitching 120 holding heating wire 22b-1 in place zigzags back and forth across the wire and is sufficiently tight such that it draws portions 100a and 100b of the fabric 100 located adjacent opposite sides of the wire upwardly to partially circumscribe the heating element 22b-1, thereby creating a continuous elongated pocket or trough 124 of semi-circular or U-shaped cross-section enclosing most of the heating element 22b-1. The stitching 120 is also preferably quite dense so as to almost completely enclose the surface of the heating element 22b-1 which is not covered by the fabric 100 of the arm section 26b-1. In other words, individual adjacent portions of the continuous thread forming the stitching are closer together than shown in FIG. 4. The stitching pattern of FIG. 4 provides a method for securely holding the heating element 22b-1 in place within the fabric of the arm section 26b-1 while still allowing the heating element 22b-1 to flex and stretch slightly with the movements of the wearer of the garment 26, thus promoting flexibility of the garment 26 and further reducing the chance of breakage of the heating element 22b-1. Additionally, this stitching arrangement allows the wire heating element 22b-1 to move longitudinally relative to adjacent fabric portions 100a and 100b within the pocket 124. This arrangement is preferably used in all of the garment sections, and further improves resistance to wire breakage and the flexibility and comfortableness of the garment sections.

The heating elements 22 may be sewn against the inside of the garment 26 fabric, i.e., that side which is in contact with the skin, or on the outside of the fabric. For example, if the outside is chosen, the physical presence of the wire outside the layer of fabric will not interfere with or degrade the action of the fabric in wicking away perspiration from the skin.

A preferred construction for the heating elements 22 is illustrated in FIGS. 4 and 5 and includes four conducting elements 140 of circular cross-section packaged within an electrically insulating jacket 142. Each conducting element 140 includes at least one, and preferably a plurality of tinsel-like conductors 144 and a plurality of high-strength flexible core portions 146 made up of several smaller synthetic fibers 148. The insulating jacket 142 is preferably made from a fluoropolymer resin and has a thickness of about 0.005 to 0.050 inches, and preferably about 0.015 inches. In addition, it is preferred that the insulation be fume-free when heated and also be relatively chemically inert. A particularly desirable insulation having the above characteristics is "TEFZEL", a fluoropolymer resin commercially available from DuPont.

The number of conducting elements 140 of a particular heating element 22 may range from one to about 20 (or more), with at least two and preferably with at least 6 to 10 being included within the insulating jacket 142. Including between about 2 and 20 conducting elements 140 within each heating element 22 provides good flexibility and also helps to resist intermittent or complete electrical or mechanical breaks within the heating element.

In FIG. 5 the tinsel-like conductors 144 and the core portions 146 of each conducting element 140 are shown more clearly. Each conducting element 140 contains at least one, and preferably at least two or more, tinsel conductors 148 wound in a spiral fashion around its associated core portion 146. The tinsel conductors 144 have an elongated rectangular cross-section-like tinsel sometimes used to decorate Christmas trees. The conductors 148 are preferably made from copper and may have an electrical resistance when wound about the core portion 146, of between about 0.005 and 0.100 ohms/ft, and preferably between about 0.030 to 0.050 ohms/ft. The conductors 148 may also have small amounts of other metal alloys included to allow for slightly easier manufacturing and to obtain maximum conductor life. The conductors 148 having such a tinsel-like form and wound in a spiral fashion further helps improve the flexibility and stretchability of the heating elements 22, and also to help provide resistance against breakage.

The core portions 146 of each conducting element 140 preferably consist of polyester or KEVLAR fibers. KEVLAR, which is also a trademark of DuPont, is an aromatic polyamide fiber of extremely high tensile strength and greater elongation resistance than even steel. By including a polyester or KEVLAR core into each conducting element 140, the tensile breaking strength of the overall heating element 22 is increased to between about 15 to 30 pounds.

The heating elements may operate and maintain their flexibility within a temperature range of at least about −40 degrees Centigrade to 150 degrees Centigrade. In addition, the heating elements 22 are each rated for preferably between about 6 to 8 amps of continuous current. The overall outside diameter of each heating element 22 will also be less than about 0.100 inches, and preferably no greater than 0.050 inches, to also help insure flexibility of the heating elements 22.

Figure 6:
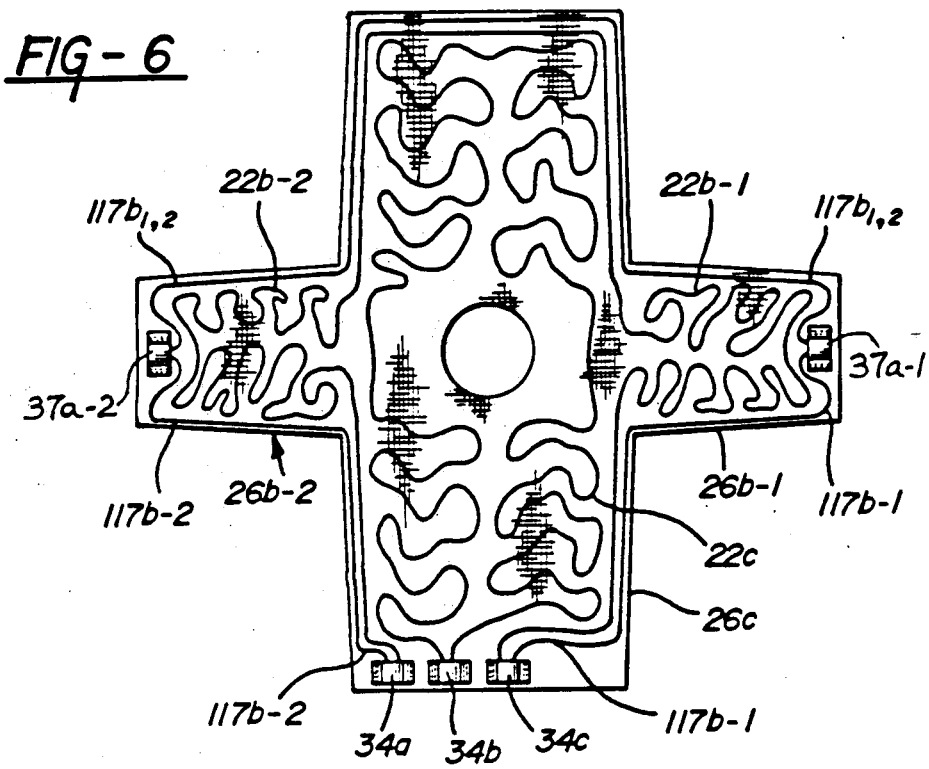
FIG. 6 is a plan view of a cross-shaped panel of fabric which is sewn the long-sleeve shirt section of the electrically heated garment, and it includes three separate wires arranged in serpentine patterns for the independent heating zones of the torso and arms, electrical connectors for these zones and for the hand covering sections of the FIG. 2 garment.

FIG. 6 shows the shirt section 26bc of the garment 26 in an unassembled condition, and ready to be sewably assembled to form a complete upper body portion of the garment 26. From FIG. 6, the unique manner in which the various heating elements 22 are routed over the shirt section 26bc and the can be seen. To help facilitate this unique routing pattern, an end of a conductor element 117b-2 has been routed to winged connector 34a. A conductor element 117b-1 providing a return path for current flow is connected to connector 34c, and is routed along the periphery of the left sleeve 26b-1 and front torso portion of the garment 26. Conductor element 117b-1,2 is then used to connect connectors 37a-1 and 37a-2. In this manner, conductor elements 117 and connectors 37a form a complete series path for current to flow through, and thereby provide power to the heating elements 22a of glove sections 26a.

The ends of the heating elements 22b-1 and 22b-2 for the left and right sleeve portions 26b-1 and 26b-2 have also been connected to separate connectors 34a and 34c, and further routed in series fashion within the area defined by the heating elements for the left and right glove portions 26a-1 and 26a-2 respectively. With the heating elements 22a of the left and right glove sections 26a and the heating elements 22b of the left and right sleeve portions 26b arranged in the manner as described above, heating element 22c for the torso portion 26c may be arranged in series with its ends both connected to connector 34b.

With the above-described routing and connection arrangement, none of the heating elements 22 overlap with one another at any point on the shirt section 26bc. This feature serves several important functions. First, it prevents localized "hot spots" which would likely result on areas of the garment where portions of the heating element 22 overlap one another. As such, the ability of the garment 26 to provide a feeling of uniform and even warmth throughout the various body portions of the garment 26 is enhanced. Second, the non-overlapping arrangement of the heating elements 22 helps to prolong the life of the heating elements 22. If various portions of each heating element were to overlap each other, the hot spots that would likely be created would work to provide additional stress and wear to the overlapping portions of each heating element, or elements, thereby shortening the life of the heating elements 22. Third, the non-overlapping arrangement allows for more stretchability of the fabric after the heating elements 22 have been sewn thereto. If portions of the heating elements 22, or even portions of a single heating element 22, were sewn so as to overlap one another, the ability of the fabric to stretch in all directions and provide comfort during physical activities requiring a wide range of motions would be reduced.

The non-overlapping heating element 22 arrangement described above also enhances the manufacturer ability of the suit. If such an arrangement were not used, attaching the conductor elements 22 to the fabric by sewing would be made considerably more difficult since greater care would be needed in the sewing process to avoid puncturing portions of a heating element which overlap each other.

Figure 7:
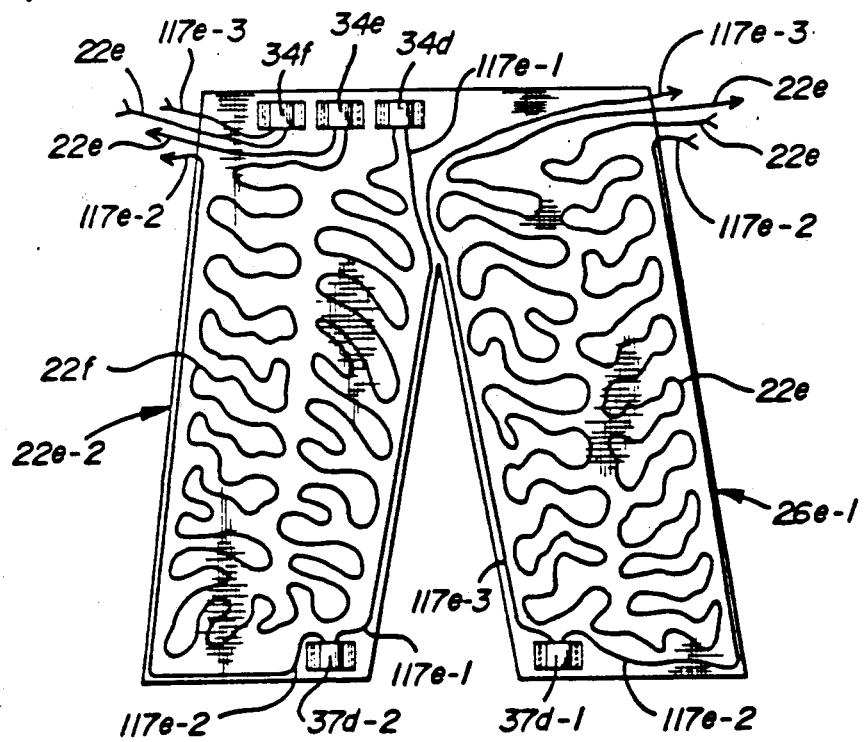
FIG. 7 is a plan view of a fabric panel to be sewn up to form the pants section of the FIG. 2 garment, and it includes wire heating elements arranged in zones and electrical connectors for the legs section and socks section of the FIG. 2 garment.

In FIG. 7 a pants portion of the garment 26 has been illustrated in an unassembled form, ready to be sewably attached along the inside and outside edges of each leg portion to form a complete pants portion. As can be seen, the conductors for supplying power to left and right sock portions 26d-1 and 26d-2 are arranged in a non-overlapping series fashion similar to the glove portions 26a shown in FIG. 6. This is accomplished by connecting a conductor element 117e-1 to connector 34d, and routing the conductor element 117e-1 close to the inside edge of the right leg portion 26e-2 and down to right sock connector 37d-2. A conductor element 117e-2 also connects with right sock connector 37d-2 and is routed along the outside edge of right pant leg 26e-2 up to the waist area and around the rear of the pants portion. Conductor element 117e-2 is then routed down along the outside edge of left leg portion 26e-1 to left sock connector 37d-1. Conductor element 117e-3 also connects with left sock connector 37d-1 and is routed upwardly along the inside edge of left pant leg 26e-1 and back near the waist area and around the rear of the pants portion, where it connects with connector 34f. The conductor elements 117e-1 through 117e-3 and connectors 37d-1 and 37d-2 thus form a series path for providing power to the sock portions 26d-1 and 26d-2.

With the conductor elements 117e-1 through 117e-3 arranged as described above, the heating element 22f for the right leg portion 26e-2 is routed in a non-overlapping, series, serpentine fashion throughout right leg portion 26e-2, and within conductor elements 117e-1 and 117e-2, by connecting its ends to connectors 34d and 34e. The heating element 22e for the left leg portion 26e-1 is then routed in a series, serpentine fashion within left leg portion 26e-1, and within the area defined by conductor elements 117e-2 and 117e-3, and its end routed around the rear waist area of the pants to connect with connectors 34e and 34f. In this manner, no portions of heating elements 22e or 22f overlap with each other, and power may be supplied in independent fashion to the heating elements 22e and 22f.

In FIG. 8A the serpentine pattern for the heating element 22d of the right sock portion 26d-2 is shown. The heating element 22d-2 is connected to the male portion of right sock connector assembly 37d-2 and is preferably routed along the inside ankle area of the sock 26d-2 and around the top of the foot area in a serpentine pattern. The heating element 22d-2 is preferably also routed around the outside toe area, and along the bottom of the sock portion 26d-2 underneath the toe area in a serpentine pattern, better shown in FIG. 8B, before it comes up along the inside foot portion of the sock 26d-2 and back into the male plug portion of right sock connector assembly 26d-2.

Although the heating element 22d-2 of the sock portion 26d-2 has been shown arranged on the sock portion 26d-2 so as to cover only the top of the foot area, it should be understood that the heating element 22d-2 could be routed so as to cover the ankle portion of sock portion 26d-2. The ankle area of the sock portion 26d-2, however, will be partially covered by the lower area of the right leg section 26e-2 of the pants portion, and as such will be supplied with heat generated by the portions of heating element 22f residing near the very bottom of right leg portion 26e-2.

It will also be noted that a strain relief portion 27d' has been included along the inside ankle area of the sock portion 26d-2. This strain relief member may consist of a plurality of stitches overlapping parallel portions of the heating element 22d-2, and serves to provide a strain relief function for the heating element 22d-2 when tension is placed on the element 22d-2 during stretching of the sock portion 26d-2 or stretching of the right leg portion 26e-1, when the plug and receptacle portions of right sock connector assembly 26d-2 are connected together. An optional form of strain relief would be VELCRO fasteners attached to the outer surface of the ankle area of sock portion 26d-2 and the inner area of the lowermost edge of right leg portion 26e-2. A VELCRO fastener arrangement would also help to provide additional strain relief to the heating element 22d-2 by helping to reduce the stress on the element 22d-2 during stretching of the sock and right leg portions 26d-2 and 26e-2 respectively during wearing of the garment 26.

In FIG. 9, a perspective view of a right glove section 26a-2 is shown. The heating element 22a-2 is arranged in series fashion preferably along the sides of the thumb and finger portions and in a serpentine fashion on the top of an upper portion of the glove 26a-2. Although the heating element 22a-2 could be routed on the palm area of the glove 26a-2, as well as over the knuckle portions of the upper surface of the glove 26a-2, the preferred layout of the heating element 22a-2 will not cover these areas to avoid the likelihood of breakage of the heating element 22a-2, which is much more likely to occur in these areas because of the stresses imparted to the fabric during gripping and other like movements of the hand.

The glove portions 26a will each preferably also contain a strain relief portion 26a' which may simply be a plurality of stitches capable of holding the heating element 22a-2 snugly at that point. The end portions of the heating element 22a-2 are also shown in a spiral wound fashion to provide a still further strain relief function when the male plug portion is inserted into its associated receptacle portion of the left glove connector assembly 37a-2. Still further strain relief means may be provided in the form of a VELCRO fastener at the wrist edge of the glove portion 26a-2, which may be arranged to removably connect with the wrist portion of right sleeve portion 26b-2. In addition, the conductor element 22a-2 will preferably extend at least one inch beyond the strain relief portion 26a' to facilitate easy connection of the plug and receptacle portions of connector assembly 37a-2.

The serpentine pattern in which the heating element 22a-2 has been arranged on right glove portion 26a-2 not only helps maintain the stretchability of the fabric of the glove portion 26a-2, but also helps prolong the life of the heating element 22a-2 by avoiding those areas of the glove portion 26a-2 which will be subject to the most direct physical contact during normal use of the hands.

Figure 10:
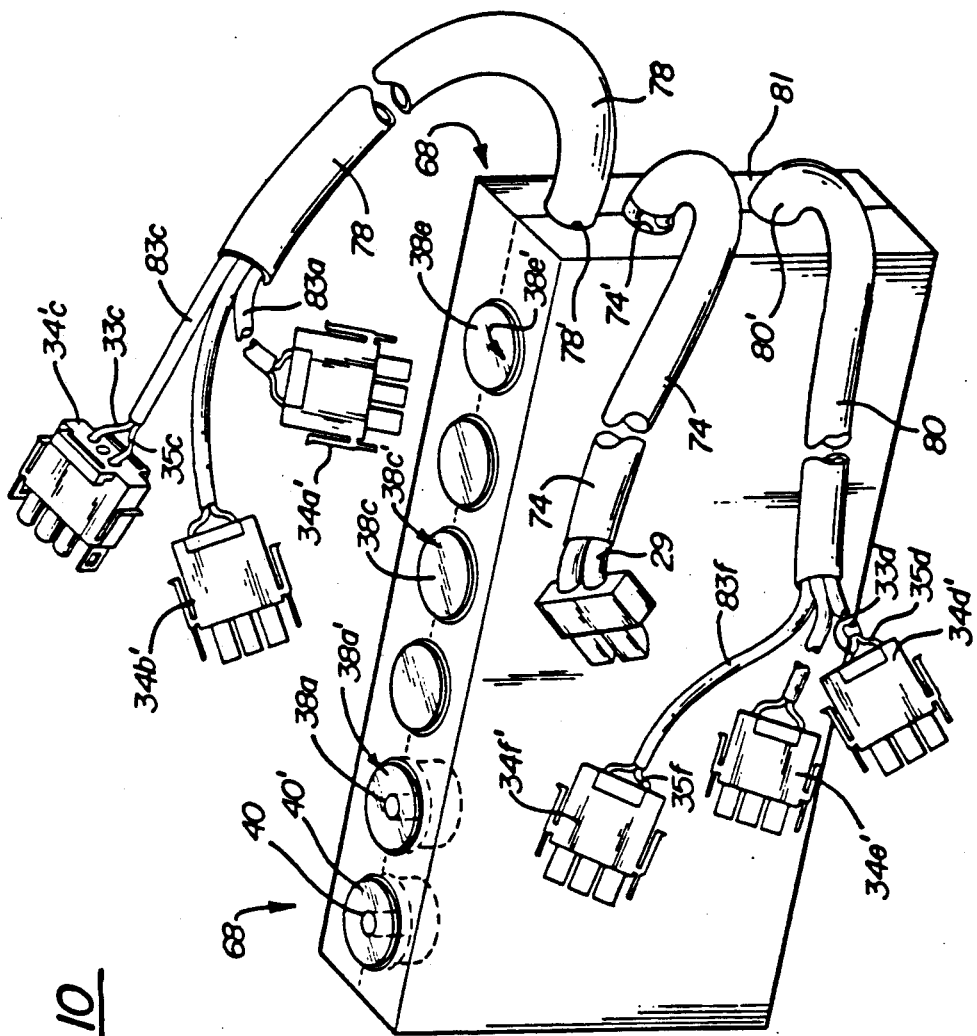
FIG. 10 is an enlarged perspective view of the slender, rectangular enclosure for the FIG. 1 control system showing wiring harnesses with attached electrical connectors extending therefrom.

FIG. 10 shows a perspective view of one possible configuration of the enclosure 68 of the control system 20. The enclosure generally includes a power cord 74 and wiring harnesses 78 and 80, and a plurality of potentiometer 40' and 38a' through 38e'.

The enclosure 68 may be made of any material suitable to provide a protective housing for the control system 20, although is preferably injection molded from a plastic to provide strength and yet be light in weight. The enclosure 68 preferably includes optional recessed portions 40" and 38a" through 38e" for each potentiometer knob 40' and 38a' through 38e' which allows each knob to rest partially therein, thereby reducing the degree to which each knob protrudes above the enclosure 68. A plurality of openings 74', 78' and 80' are further included in a vertical side portion 81 of the housing unit for allowing harnesses 74, 78 and 80 to enter therethrough. The housing unit may take a wide variety of forms, but will preferably be rectangular, and preferably fairly thin, to allow it to be worn relatively unobtrusively at the waist area of the garment 26. Typical dimensions of the housing unit are about 4 inches in height, about 1 inch in width, and about 5 inches in length.

Each of the wiring harnesses 74, 78 and 80 preferably is comprised of a flexible outer tubing. The tubing may be made from a wide variety of flexible materials but preferably is of plastic, nylon or rubber construction. Alternatively, the tubing could even be comprised of conventional shrink wrap tubing. The important consideration is that the tubing be relatively flexible to allow the harnesses 74, 78 and 80 to be easily manipulated when connecting the male plug portions 34a' through 34f' to their respective receptacle portions 34a through 34f. The tubing sections may vary widely in length, but each will preferably be from about 6 to 24 inches in length.

The electrical conductors 33a and 35a through 33f and 35f connecting with each male plug portion 34a' through 34f' will also preferably be enclosed within relatively short sections of tubing 83a through 83f. This tubing may also be comprised of a wide variety of materials, although conventional shrink wrap tubing would be a particularly effective and inexpensive means for covering the electrical conductors 33a and 35a through 33f and 35f up to the point where they enter their respective male plug portions 34a' through 34f'.

The power cord harness 74 may also vary widely in length, but preferably will be between about 3 and 12 inches long. The power cord harness 74 is operable to connect with a DC power source, such as a battery, to thereby provide power to the system.

The potentiometer knobs 40' and 38a' through 38e' are associated with a particular zone, with knob 40' being associated with potentiometer 40, knob 38a' being associated with potentiometer 38a, etc. Optionally, the potentiometer knobs may even be covered by a moveable flap which may be opened when the wearer needs to adjust the power levels of any of the zones 24, and closed in a position so as to cover completely the knobs, thereby preventing any possibility of accidentally bumping any of the knobs, during use of the garment.

Although the present invention has been described in connection with particular illustrations and examples thereof, it will be apparent to those skilled in the art that numerous other variations and modifications of the herein disclosed invention may be readily made without departing from the true and fair scope of the subjoined claims.

What is claimed is:

1. A portable, wearable electrically heated, cold-weather garment system having a plurality of independently, controllable heating zones, comprising:
 a lightweight, stretchable, form-fitting fabric assembly defining shirt and pants portions, at least one glove portion and at least one sock portion, and wherein each portion of the fabric assembly includes fabric made from material which is operable to wick away moisture from the skin of a wearer and dissipate the moisture relatively quickly, thereby helping to keep the wearer dry;
 a plurality of flexible conductors, each such conductor being operable to generate heat in response to current flowing therethrough, at least one such conductor being independently associated with the pants portion and constituting a first heating zone, at least one such conductor being independently associated with the shirt portion and constituting a second heating zone, at least one such conductor being independently associated with the glove portion and constituting a third heating zone, and at least one such conductor being independently associated with the sock portion and constituting a fourth heating zone;
 portable, wearable electronic controller means for controlling in independent fashion the electrical current flowing through each such conductor constituting a zone, thereby controlling independently the heat generated by each such conductor for each such zone, the controller means including a plurality of solid-state power switching devices, with at least one such device for each such flexible conductor and zone through which electrical current is controlled in independent fashion, and power level selection means for allowing manual control over the controller means by a wearer of the form-fitting fabric assembly; and
 connector means for helping to connect the controller means with the independent conductors.

2. The garment system of claim 1, wherein the shirt portion further comprises:
 a left arm portion having a first portion of a single such conductor associated therewith, the conductor further being arranged on the left arm portion in a serpentine pattern to evenly distribute the heat generated by the conductor throughout the left arm section; and
 a right arm portion having a second portion of a said single such conductor independently associated therewith, the conductor further being arranged in a serpentine pattern to evenly distribute heat generated by the conductor throughout the right arm portion and
 wherein the first and second portions of said single such conductor of the left arm and right arm portions are connected in series on the garment in such a fashion so as to not overlap other conductors.

3. The garment system of claim 1, wherein the shirt portion comprises front and rear torso portions, each such torso portion having different portions of a single conductor associated therewith; and
 wherein the conductor portions associated with the front and rear torso portions are connected in series and in such a manner so as to not overlap other conductors of the garment.

4. A portable, wearable electrically heated, cold weather garment system comprising:
 relatively light weight, stretchable, form-fitting fabric means for covering at least a portion of the body of a wearer of the garment;
 flexible conductor means, including a plurality of conductors secured to the fabric means, each being associated with an independently controlled heating zone, for generating heat in response to current flowing therethrough, to thereby provide warmth to a wearer of the garment;
 portable, wearable electronic controller means, including a plurality of solid-state power switching devices each of which is associated with a distinct heating zone, for controlling in a pulse width modulated fashion current flowing through the conductor means, thereby controlling the heat generated by the conductor means; and
 a plurality of first power level selection means for allowing manual control over the controller means by a wearer of the garment, thereby providing wearer control over current flowing through the conductor means, and thereby providing wearer control over the heat generated by the conductor means.

5. The garment system of claim 4, wherein direct current (D.C.) electrical power is used as the source of power to the controller means, and the controller means utilizes a combination of analog and digital signals operable to control in a pulse width modulated fashion the direct current flowing through the conductor means, thereby controlling the heat generated by the conductor means.

6. The garment system of claim 4, wherein the fabric means is divided into and defines a plurality of independent heating zones; and
wherein the plurality of conductors are each associated with a single such heating zone to thereby heat independently a particular heating zone of the garment.

7. The garment system of claim 4, further comprising second power level selection means which includes a single manually operable power level selection device to control the controller means to uniformly and simultaneously increase or decrease the current flow through each of the conductors in each of the heating zones.

8. A portable, wearable electrically heated, cold weather garment system comprising:
at least an upper body garment portion having at least first and second independent heating zones;
at least one independent conductor associated with each such independent heating zone of the garment portion, each such conductor being operable to generate heat in response to a current flowing therethrough; and
portable, wearable electronic controller means operating on direct current (D.C.) electrical power for simultaneously and independently controlling in pulse width modulated fashion the current flowing through each such independent conductor, thereby independently and simultaneously controlling the heat generated by each such independent conductor, to thereby provide independent and simultaneous control of the level of heating provided to each independent heating zone of the garment.

9. The garment system of claim 8, further comprising:
a plurality of first power level selection devices, each such first device being independently associated with one such independent conductor, and operable to control current flowing through its associated conductor; and
a master power level selection device for uniformly and simultaneously increasing or decreasing the current flowing through each such conductor, to thereby uniformly and simultaneously increase or decrease the heat generated by each conductor of each heating zone.

10. An electrically heated, cold weather garment system comprising:
lightweight, stretchable, form-fitting fabric means for covering at least a portion of a body of a wearer of the garment;
flexible conductor means arranged in a serpentine pattern for generating heat in response to a current flow therethrough, and for distributing the heat uniformly throughout the fabric means;
cover stitch means for securing the conductor means to the fabric means and for substantially circumscribing at least a portion of the conductor means;
portable, wearable, electronic controller means for controlling in pulse width modulated fashion the current flow through the conductor means, the controller means further being secured to a portion of the garment;
power level selection means for providing manual control over the controller means by a wearer of the garment;
a flexible wiring harness having first and second ends, the first end being connectable to the controller means; and
electrical connector means securely mounted to a portion of the fabric means for removably connecting the second end of the wiring harness with the conductor means, the electrical connector having at least one wing portion for helping to facilitate mounting of the connector means to the fabric means.

11. The garment system of claim 10, wherein the fabric means defines a plurality of independent heating zones; and
wherein the flexible conductor means comprises a plurality of electrical conductors, each such conductor being independently associated with a particular such heating zone of the garment.

12. The garment system of claim 10, wherein the controller means comprises:
means for providing an analog control signal operable to help control the current flowing through the conductor means in accordance with a first power level adjustment by the wearer of the garment; and
means for providing a digital control signal for further helping to control, in combination with the means for providing an analog control signal, the current flowing through the conductor means.

13. The garment system of claim 10, wherein the fabric means defines a plurality of independent heating zones of the garment; and
wherein the conductor means comprises a plurality of electrical conductors, each such conductor being independently associated with a particular such heating zone of the garment; and
wherein the power level selection means comprises a plurality of first power level selection devices and a second power level selection device, each such first power level selection device being independently associated with a particular such electrical conductor and operable to provide manual control by the wearer of the garment over the current flow through its associated electrical conductor, the second power level selection device being operable to allow the wearer of the garment to uniformly and simultaneously increase or decrease the current flow through each such electrical conductor, thereby uniformly and simultaneously increasing or decreasing the heat generated by each such conductor.

14. The garment system of claim 10, wherein the conductor means comprises a plurality of electrical conductors.

15. The garment system of claim 14, wherein the fabric means comprises:
an independent shirt portion having an independent torso portion and independent sleeve portions, the torso portion being independently associated with at least one such electrical conductor, and the sleeve portions being independently associated with at least one such electrical conductor;
an independent pants portion having a plurality of leg portions, each such leg portion being independently associated with a particular such electrical conductor;

a plurality of sock portions, each such sock portion being independently associated with a particular such electrical conductor; and a plurality of glove portions, each such glove portion being independently associated with a particular such electrical conductor.

16. The garment system of claim 10, wherein the conductor means comprises a plurality of independent electrical conductors; and wherein the electrical connector means comprises a plurality of electrical connectors, each such connector being independently associated with a particular such conductor and operable to interrupt the current flowing through its associated conductor when such current exceeds a predetermined level.

17. The garment system of claim 16, wherein each electrical connector further comprises a wearer removable fuse for interrupting current flowing through its associated conductor when such current exceeds a predetermined level.

18. For an electrically heated, cold-weather garment, an electrically heated sock, comprising:

lightweight, stretchable, form-fitting fabric means for covering a foot of a wearer of the sock, the fabric means further being operable to wick away moisture, thereby helping to keep the foot of the wearer and the fabric means dry;

flexible conductor means arranged on at least a portion of the fabric means in a serpentine pattern for generating heat in response to a current flow therethrough, and for distributing the heat evenly throughout portions of the fabric means; and cover stitch means for securing the conductor means to the fabric means and for substantially circumscribing a portion of but not all of the circumference of the conductor means in a manner which allows the conductor to move slightly relative to the fabric means, the cover stitch means including stitching arranged to substantially cover the portion of the conductor not wrapped therearound by the fabric means.

19. For an electrically heated, cold-weather garment, an electrically heated glove, comprising:

lightweight, stretchable, form-fitting fabric means for covering at least a portion of a hand of a wearer of the garment, the fabric means further being operable to wick away moisture, thereby helping to keep the hand of the wearer and the fabric means dry;

flexible conductor means arranged on at least a portion of the fabric means in a serpentine pattern for generating heat in response to a current flow therethrough, and for distributing the heat evenly throughout portions of the fabric means; and cover stitch means for securing the conductor means to the fabric means and for substantially circumscribing a portion of but not all of the circumference of the conductor means in a manner which allows the conductor to move slightly relative to the fabric means, the cover stitch means including stitching arranged to substantially cover the portion of the conductor not wrapped therearound by the fabric means.

20. The glove of claim 19, further comprising a removable connector assembly having at least one winged portion, the connector assembly being operable to connect the conductor means with an electronic controller to thereby allow the controller to regulate the current flow through the conductor means, and the wing portion being operable to help facilitate attachment of the connector assembly to the fabric means by sewing.

21. The sock of claim 18, further comprising a removable connector assembly having at least one wing portion, the connector assembly being operable to connect the conductor means with an electronic controller to thereby allow the controller to regulate the current flow through the conductor means. and the wing portion being operable to help facilitate attachment of the connector assembly to the fabric means by sewing.

* * * * *